United States Patent
Huang

(10) Patent No.: US 8,467,128 B2
(45) Date of Patent: Jun. 18, 2013

(54) POLARIZING CUBE AND METHOD OF FABRICATING THE SAME

(75) Inventor: Herb He Huang, Shanghai (CN)

(73) Assignee: Shanghai Lexvu Opto Microelectronics Technology Co., Ltd., Shanghai (CN)

( * ) Notice: Subject to any disclaimer, the term of this patent is extended or adjusted under 35 U.S.C. 154(b) by 727 days.

(21) Appl. No.: 12/622,382

(22) Filed: Nov. 19, 2009

(65) Prior Publication Data

US 2010/0128347 A1 May 27, 2010

Related U.S. Application Data

(60) Provisional application No. 61/116,158, filed on Nov. 19, 2008.

(51) Int. Cl.
*G02B 5/30* (2006.01)

(52) U.S. Cl.
USPC .................................. 359/485.05; 359/489.09

(58) Field of Classification Search
USPC ............................ 359/485.05, 485.06, 489.09
See application file for complete search history.

(56) References Cited

U.S. PATENT DOCUMENTS

| | | |
|---|---|---|
| 2,224,214 A | 12/1940 | Brown et al. |
| 2,287,598 A | 6/1942 | Brown et al. |
| 2,748,659 A | 6/1956 | Geffcken et al. |
| 2,887,566 A | 5/1959 | Marks et al. |
| 3,046,839 A | 7/1962 | Bird et al. |
| 3,436,143 A | 4/1969 | Garrett et al. |
| 3,479,168 A | 11/1969 | Bird et al. |
| 3,536,373 A | 10/1970 | Bird et al. |
| 3,566,099 A | 2/1971 | Makas |
| 3,631,288 A | 12/1971 | Rogers |
| 3,857,627 A | 12/1974 | Harsch |
| 3,876,285 A | 4/1975 | Schwarzmuller |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |

(Continued)

FOREIGN PATENT DOCUMENTS

| | | |
|---|---|---|
| DE | 296391 | 2/1917 |
| DE | 416157 | 7/1925 |

(Continued)

OTHER PUBLICATIONS

Chinese First Examination Report of China Application No. 200910222604.X, dated Jan. 31, 2011.

*Primary Examiner* — Frank Font
(74) *Attorney, Agent, or Firm* — J.C. Patents

(57) ABSTRACT

A polarizing cube includes a pair of identical and symmetric triangular prisms which sandwich a thin optical composite plate containing a planner array of reflective straight wires spaced apart in parallel as a built-in wire grid polarizer. All of its subcomponents and the polarizing cube itself are physically and optically symmetrical to one of its diagonal planes so as to provide improved integration and robustness for projection display application. The cubic configuration of the disclosed polarizer can be readily produced through common means and sequences typically used in semiconductor wafer fabrication processes, including photolithographic patterning, gap dielectric filling and planarization, and wafer thinning, bonding and cutting among others.

14 Claims, 6 Drawing Sheets

U.S. PATENT DOCUMENTS

| | | | |
|---|---|---|---|
| 4,073,571 A | 2/1978 | Grinbert et al. | |
| 4,181,756 A | 1/1980 | Fergason | |
| 4,220,705 A | 9/1980 | Sugibuchi et al. | |
| 4,221,464 A | 9/1980 | Pedinoff et al. | |
| 4,268,127 A | 5/1981 | Oshima et al. | |
| 4,289,381 A | 9/1981 | Garvin et al. | |
| 4,456,515 A | 6/1984 | Krueger et al. | |
| 4,466,704 A | 8/1984 | Schuler et al. | |
| 4,512,638 A | 4/1985 | Sriram et al. | |
| 4,514,479 A | 4/1985 | Ferrante | |
| 4,515,441 A | 5/1985 | Wentz | |
| 4,688,897 A | 8/1987 | Grinberg et al. | |
| 4,711,530 A | 12/1987 | Nakanowatari et al. | |
| 4,743,092 A | 5/1988 | Pistor | |
| 4,759,611 A | 7/1988 | Downey, Jr. | |
| 4,759,612 A | 7/1988 | Nakatsuka et al. | |
| 4,799,776 A | 1/1989 | Yamazaki et al. | |
| 4,818,076 A | 4/1989 | Heppke et al. | |
| 4,865,670 A | 9/1989 | Marks | |
| 4,895,769 A | 1/1990 | Land et al. | |
| 4,913,529 A | 4/1990 | Goldenbert et al. | |
| 4,946,231 A | 8/1990 | Pistor | |
| 4,966,438 A | 10/1990 | Mouchart et al. | |
| 4,991,937 A | 2/1991 | Urino | |
| 5,029,988 A | 7/1991 | Urino | |
| 5,061,050 A | 10/1991 | Ogura | |
| 5,067,805 A * | 11/1991 | Corle et al. | 359/235 |
| 5,087,985 A | 2/1992 | Kitaura et al. | |
| 5,113,285 A | 5/1992 | Franklin et al. | |
| 5,122,887 A | 6/1992 | Mathewson | |
| 5,122,907 A | 6/1992 | Slocum | |
| 5,139,340 A | 8/1992 | Okumura | |
| 5,157,526 A | 10/1992 | Kondo et al. | |
| 5,177,636 A | 1/1993 | Furuhashi | |
| 5,225,920 A | 7/1993 | Kasazumi et al. | |
| 5,235,443 A | 8/1993 | Barnik et al. | |
| 5,235,449 A | 8/1993 | Imazeki et al. | |
| 5,239,322 A | 8/1993 | Takanashi et al. | |
| 5,245,471 A | 9/1993 | Iwatsuka et al. | |
| 5,295,009 A | 3/1994 | Barnik et al. | |
| 5,305,143 A | 4/1994 | Taga et al. | |
| 5,325,218 A | 6/1994 | Willett et al. | |
| 5,333,072 A | 7/1994 | Willett | |
| 5,357,370 A | 10/1994 | Miyatake et al. | |
| 5,383,053 A | 1/1995 | Hegg et al. | |
| 5,422,756 A | 6/1995 | Weber | |
| 5,436,761 A | 7/1995 | Kamon | |
| 5,486,935 A | 1/1996 | Kalmanash | |
| 5,486,949 A | 1/1996 | Schrenk et al. | |
| 5,490,003 A | 2/1996 | Van Sprang | |
| 5,506,704 A | 4/1996 | Broer et al. | |
| 5,508,830 A | 4/1996 | Imoto et al. | |
| 5,513,023 A | 4/1996 | Fritz et al. | |
| 5,513,035 A | 4/1996 | Miyatake et al. | |
| 5,517,356 A | 5/1996 | Araujo et al. | |
| 5,557,343 A | 9/1996 | Yamagishi | |
| 5,559,634 A | 9/1996 | Weber | |
| 5,570,215 A | 10/1996 | Omae et al. | |
| 5,574,580 A | 11/1996 | Ansley | |
| 5,579,138 A | 11/1996 | Sannohe et al. | |
| 5,594,561 A | 1/1997 | Blanchard | |
| 5,612,820 A | 3/1997 | Schrenk et al. | |
| 5,619,356 A | 4/1997 | Kozo et al. | |
| 5,626,408 A | 5/1997 | Heynderickx et al. | |
| 5,748,368 A | 5/1998 | Tamada et al. | |
| 5,748,369 A | 5/1998 | Yokota | |
| 5,833,360 A | 11/1998 | Knox et al. | |
| 6,243,199 B1 | 6/2001 | Hansen et al. | |
| 6,288,840 B1 | 9/2001 | Perkins et al. | 359/486 |
| 6,466,322 B1 * | 10/2002 | Paldus et al. | 356/437 |
| 2007/0296921 A1 * | 12/2007 | Wang et al. | 353/20 |
| 2007/0297052 A1 | 12/2007 | Wang et al. | 359/486 |

FOREIGN PATENT DOCUMENTS

| | | |
|---|---|---|
| DE | 37 07 984 A1 | 9/1988 |
| EP | 0 317 910 A1 | 5/1989 |
| EP | 0 336 334 B1 | 10/1989 |
| EP | 0 349 309 B1 | 1/1990 |
| EP | 0 349 144 B1 | 3/1990 |
| EP | 0 407 830 A2 | 1/1991 |
| EP | 0 416 157 A1 | 3/1991 |
| EP | 0 488 544 A1 | 6/1992 |
| EP | 0 507 445 A2 | 10/1992 |
| EP | 0 518 111 A1 | 12/1992 |
| EP | 0 521 591 B1 | 1/1993 |
| EP | 0 543 061 A1 | 5/1993 |
| EP | 0 588 937 B1 | 3/1994 |
| EP | 0 606 940 A2 | 7/1994 |
| EP | 0 357 946 B1 | 8/1994 |
| EP | 0 634 674 A2 | 1/1995 |
| EP | 0 670 506 A1 | 9/1995 |
| EP | 0 407 830 B1 | 9/1996 |
| EP | 0 744 634 A2 | 11/1996 |
| JP | 64-84502 | 3/1989 |
| RU | 1781659 A1 | 12/1992 |

* cited by examiner

POLARIZING CUBE AND METHOD OF FABRICATING THE SAME

CROSS-REFERENCE TO RELATED APPLICATIONS

This application claims priority of provisional application No. 61/116,158, filed on Nov. 19, 2008, entitled "Polarizing Cube and Method of Making Same", which is incorporated herein by reference in its entirety.

FIELD OF THE TECHNOLOGY

The present invention relates to an optical polarizing core for use in projection display applications. More particularly, the present invention relates to integrated wire grid polarizers in a planner diagonal configuration of an optical cube used as an optical engine core for microdisplay projection application.

BACKGROUND

Wire grid polarizers (WGP) have been not only used in polarizing optical systems but also effectively applied as beam splitters as well, particularly in liquid crystal based microdisplay projection applications. Such a beam splitter operates in a fairly wide visible spectrum which reflects one linear polarization and transmits the other, with considerable high contrast and optical efficiency among other advantages Polarizing wire grids are disposed on an outer surface of an optical transparent substrate, such as glass. A conventional wire grid polarizer basically consists of elongated but spaced-apart wire grids, made of a reflective metal such as aluminum in a nanometer scale, in a parallel array adherent to a flat glass panel as disclosed by Hansen in U.S. Pat. No. 6,243,199. Obviously, this configuration is very fragile under challenging assembly and application conditions in which physical and chemical damages could easily occur on those fine scale metal grids. Various modifications in a variety of physical configurations based on the conventional configuration of a thin plate are made to improve robustness while maintaining or enhancing optical performance of polarization and beam splitting functions as designed.

FIG. 1a is a schematic view of a conventional wire grid polarizing panel 10 in prior art. The configuration of such a wire grid polarizing panel 10 includes an array of elongated reflective elements 2 laid onto a glass plate 1, which is fairly fragile to any external damage during fabrication and handling. FIG. 1b illustrates a simple optical engine 5 for projection display, employing a wire grid polarizing panel 10 associated with a reflective imager 90 and a light source 95. The wire grid polarizing panel 10 reflects incident illumination in one polarization state, P, which illuminates the reflective imager 90 for projection display formation, and let pass the other, S.

Even in such simple configuration, need becomes obvious for improvement in the system integration and robustness of the optical engine 5 and its core components, the wire grid polarizing panel 10 and the reflective imager 90. It is highly desirable that those two critical components, the wire grid polarizing panel 10 and the reflective imager 90, are better physically integrated and aligned, while optical distinction between them is minimized.

SUMMARY

One aspect of the present invention is related to a wire grid polarizer in a cubic configuration. In a wire grid polarizer according to an embodiment of the present invention, a set of straight wires, made of a reflective material and spaced apart in parallel, are embedded symmetrically to a diagonal plane and sandwiched by two optically transparent symmetric triangular prisms. Those straight wires, or wire grids, and the body of a polarizing cube are physically symmetric relative to the diagonal plane. Such a polarizing cube can provide reflection on one linear polarization while transmission of the other orthogonal to an incident illumination passing through a light receiving face of this polarizing cube while an reflective imager being mounted on an imager-mounting face, wherein the light receiving face and the imager-mounting face are on one side of the diagonal plane.

In one embodiment, the straight wires, spaced apart in parallel, are made of aluminum or silver metal, while the rest of the body of the polarizing cube, such as the prisms and the substrates surrounding the straight wires, are made from silicon dioxide or glass. Such a delicate array of nano-scale reflective metal straight wires may be deliberately fabricated and embedded in a glass cube through the disclosed scheme of method similar to conventional semiconductor wafer processes.

The present invention can provide improved integration and robustness for projection display application. The cubic configuration of the disclosed polarizer can be readily produced through common means and sequences typically used in semiconductor wafer fabrication processes, including photolithographic patterning, gap dielectric filling and planarization, and wafer thinning, bonding and cutting among others.

BRIEF DESCRIPTION OF THE DRAWINGS

The disclosure may be more completely understood in consideration of the following detailed description of various embodiments in connection with the accompanying drawings, in which:

FIG. 2b is a blow up view at one corner of the polarizing cube 100 shown in FIG. 2a.

DETAILED DESCRIPTION

Description and deliberation will now be made to the drawings in which the various elements of the present invention will be given numerical designations and in which the invention will be discussed so as to enable one skilled in the art to make and use the invention.

Figure 1B:
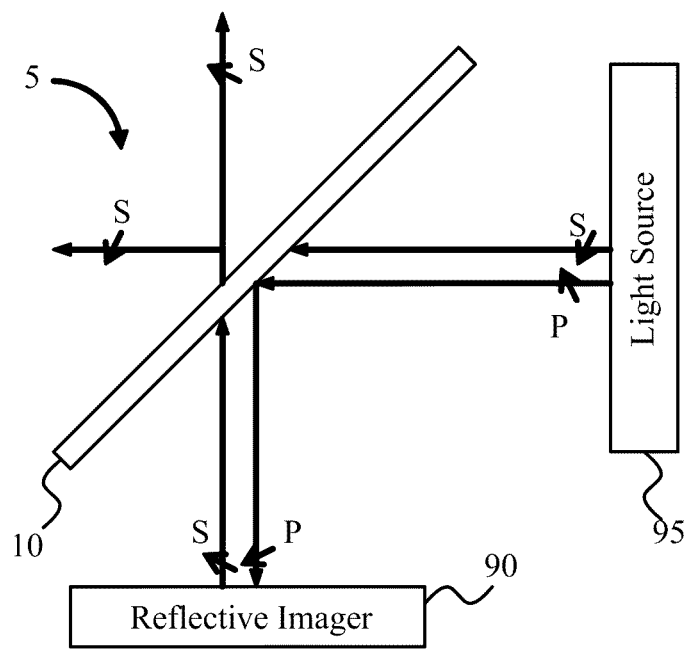
FIG. 1b is a cross-sectional view of a simple optical engine 5 using the conventional wire grid polarizing panel 10 as the polarizing beam splitter in prior art with a reflective imager 90 and a light source 95.
Figure 2A:
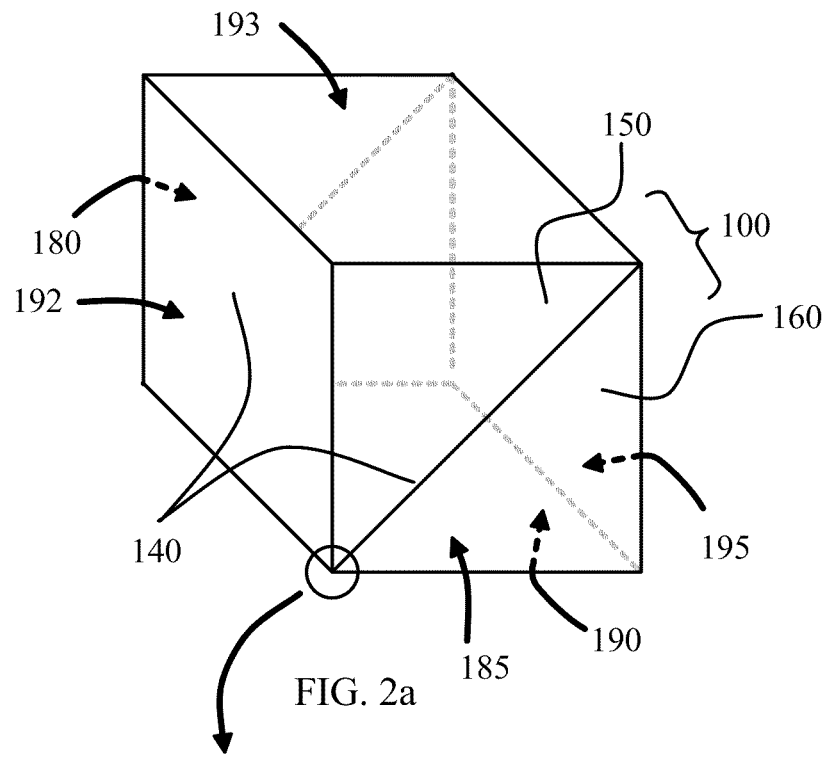
FIG. 2a is a side view of a polarizing cube 100 integrating a planner array of straight wires 110, used as a wire gird polarizer and beam splitter in one embodiment of the present invention.
Figure 2B:
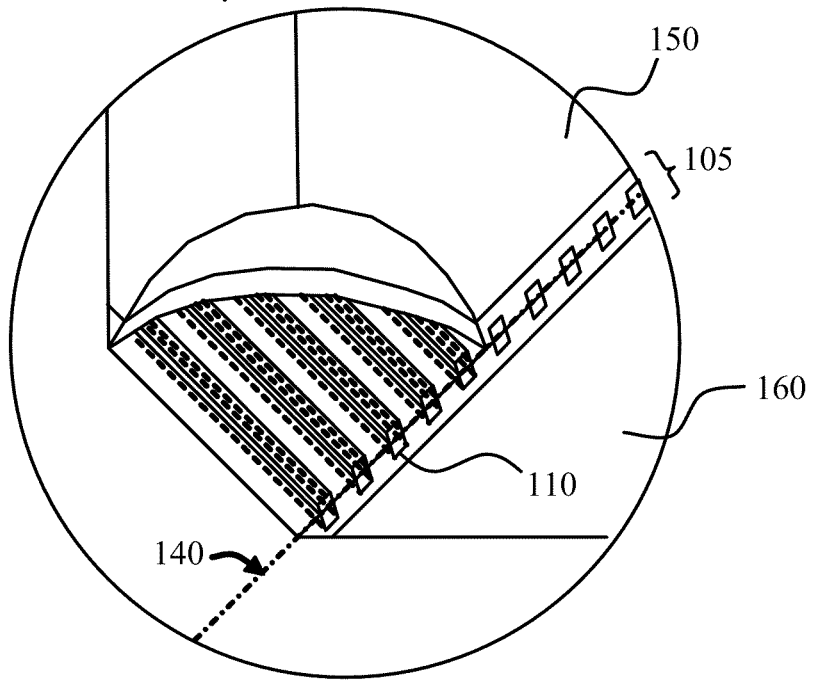

FIG. 2a is a side view of a polarizing cube 100, used as a wire gird polarizer and beam splitter in an embodiment of the present invention, integrating a planner array of straight wires 110. FIG. 2b is a blow up view at one corner of the polarizing cube 100 shown in FIG. 2a. The polarizing cube 100 is physically symmetric relative to a diagonal plane 140 on which the planner array of straight wires 110 are symmetrically laid out and sandwiched by a pair of symmetric triangular prisms, i.e., an upper triangular prism 150 and a lower triangular prism 160. One of the perpendicular faces of the lower triangular prism 160, or the light receiving face 195, is used to receive an incident illumination in one polarization state, as shown in FIG. 1b, and let pass towards the planner array of straight wires 110. The planner array of straight wires 110 reflects the incident illumination in this polarization state towards another imager-mounting face 190 of the lower triangular prism 160 on which a reflective imager 90 (FIG. 1b) can be mounted.

In one embodiment of the disclosed invention, the polarizing cube 100 includes two symmetric triangular prisms i.e., an upper triangular prism 150 and a lower triangular prism 160, and a thin composite plate 105 containing the planner array of straight wires 110 but sandwiched by the symmetric triangular prisms 150 and 160, being symmetric to the diagonal plane 140. As shown in FIG. 2b, each straight wire is symmetric to the diagonal plane 140 along the center line of the straight wire. The planner array of straight wires 110 are surrounded by a first transmissive material within the thin composite plate 105, while the symmetric triangular prisms 150 and 160 are made of a second transmissive material. Either or both of the first transmissive material and the second transmissive material may be made from silicon dioxide and furthermore, in the identical composition.

Figure 1A:
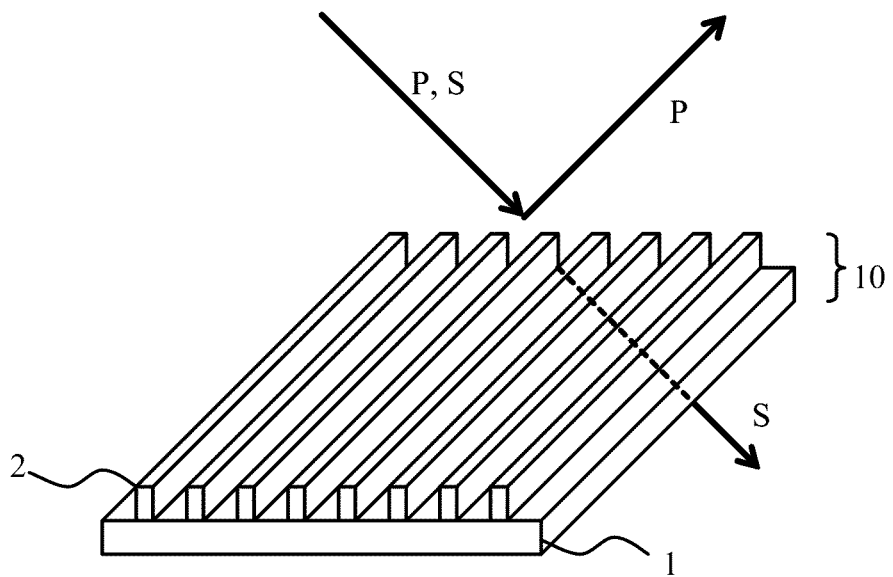
FIG. 1a is a schematic view of a conventional wire grid polarizing panel 10 in prior art.

In another embodiment of this disclosed invention, any or all faces of the polarizing cube 100 each sharing one edge with the thin composite plate 105, such as faces 190, 192, 193 and 195, may be coated with an antireflective coating for reducing surface reflection loss and improving optical efficiency and performance of the optical engine, as the polarizing cube 100 being used in similar configuration shown in FIG. 1 for projection display.

Meanwhile, it is possible to coat two faces 180 and 185 perpendicular to the thin composite plate 105 with a light absorbing material to reduce unwanted glaring effect to normal light paths for projection application. Alternatively, any one of two faces 180 and 185 perpendicular to the thin composite plate 105 may be adhered with a photovoltaic panel which converts diffracted illumination to electric charge readily to be stored and reused.

In practical cases, the planner array of straight wires 110 may be made of any one or of any combination of reflective metals including silver, aluminum, titanium and gold.

Figure 3A:
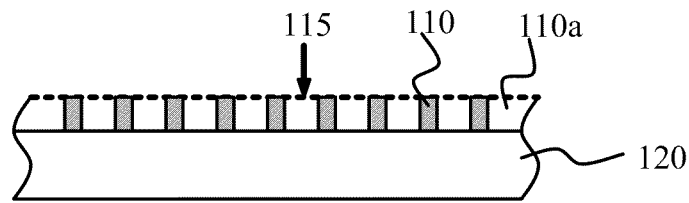
FIGS. 3a, 3b and 3c are a series of cross section views illustrating the method of fabricating the polarizing cube 100 in one embodiment of the disclosed invention.
Figure 3B:
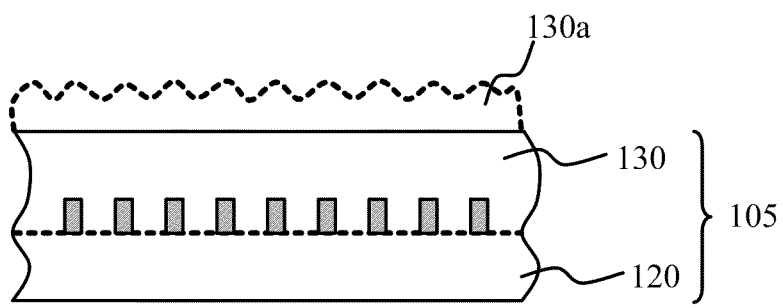
Figure 3C:
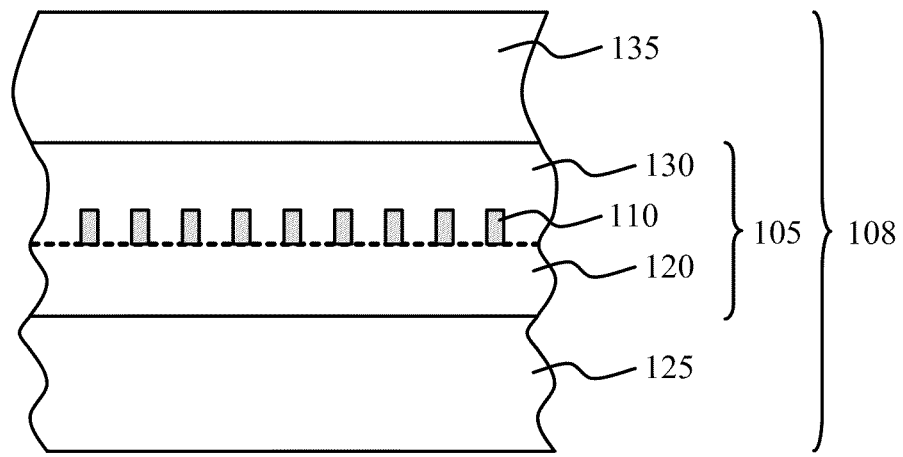

FIGS. 3a, 3b and 3c are a series of cross section views illustrating the method of fabricating the polarizing cube 100 in one embodiment of the disclosed invention. A blanket film 110a of a desired thickness, made from a reflective material, is first deposited onto a first substrate 120 covered by a first transmissive material. The planner array of straight wires 110, spaced apart in parallel, are formed through photolithography and micromachining processes such as dry etching, spaced apart in parallel and separated by a set of gaps 115, as shown in FIG. 3a. The gaps 115 are straight. Deposition of an overcoat film 130 of the same first transmissive material is then performed to completely fill all the gaps 115 separating those straight wires 110 and overcoat them in a desired thickness. A chemical vapor deposition may be employed to deposit such an overcoat film 130 made of silicon dioxide. The overcoat film 130 is further planarized by chemical mechanical polishing off the uneven portion 130a from the overcoat film 130 to form the thin composite plate 105, as shown in FIG. 3b.

By using adhesion bonding, a first thick substrate 135 of a second thickness made of a second transmissive material is seamlessly bonded to the planarized and thinned face of the overcoat film 130 and thus bonded to the thin composite plate 105, opposite to the first substrate 120 covered by the first transmissive material. In practice, common wafer to wafer bonding methods can be employed to achieve such bonding, including anodic bonding and fusion bonding as shown in FIG. 3c.

In one embodiment of the disclosed invention, the first substrate 120 is then thinned to the same thickness as the planarized overcoat film 130 of the same first transmissive material, using the bonded first thick substrate 135 of the second thickness as the carrier for thinning process. Then bonding is again employed to bond a second thick substrate 125 of the same second thickness made from the second transmissive material as the first thick substrate 135, to the thinned first substrate 120 opposite to the first thick substrate 135, to form a thick composite plate 108 including the first thick substrate 135, the thin composite plate 105 and the second thick substrate 125, as illustrated in FIG. 3c.

In an application case of the disclosed invention, both the first transmissive material and the second transmissive material may be silicon dioxide or glass based. For improving the optical transparency of those transmissive materials upon a series of processes stated here, one or multiple times of thermal treatment may be employed as long as temperature in those thermal treatments is substantially below the lowest melting temperature among all the materials incorporated, such as the reflective material, the first transmissive material and the second transmissive material. In case silicon and silicon dioxide are used, glass tempering is very helpful for this purpose in a single or multiple steps.

FIGS. 4a, 4b, 4c, 4d and 4e are a series of cross section views illustrating another method of fabricating the polarizing cube 100 in another embodiment of the disclosed invention. The first transmissive film 121 made of a first transmissive material of a first thickness is produced onto a sacrificial substrate 122 made of a sacrificial material. The sacrificial material may be silicon and the first transmissive material may be silicon dioxide. Either thermal oxidation or chemical vapor deposition or combination of both may be used to produce the first transmissive film 121 of the desired first thickness.

Figure 4A:
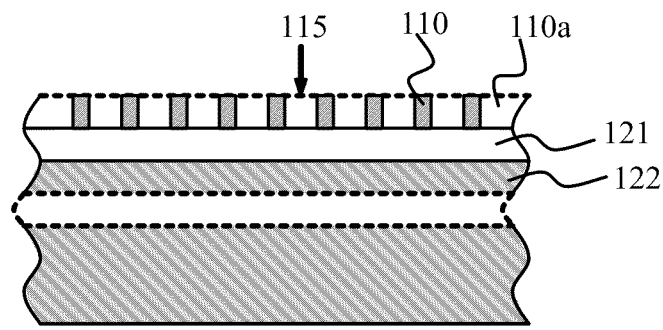
FIGS. 4a, 4b, 4c, 4d and 4e are a series of cross section views illustrating the method of fabricating the polarizing cube 100 in another embodiment of the present invention.

Then, similar to the previous method as shown in FIGS. 3a to 3c, the blanket film 110a of the reflective material is deposited onto the first transmissive film 121 and lithographically patterned to form the set of straight wires 110, spaced apart in parallel and separated by a set of gaps 115, as shown in FIG. 4a. The overcoat film 130, also made of the first transmissive material, is deposited for completely filling the gaps 115 and for covering the planner array of straight wires 110.

Figure 4B:
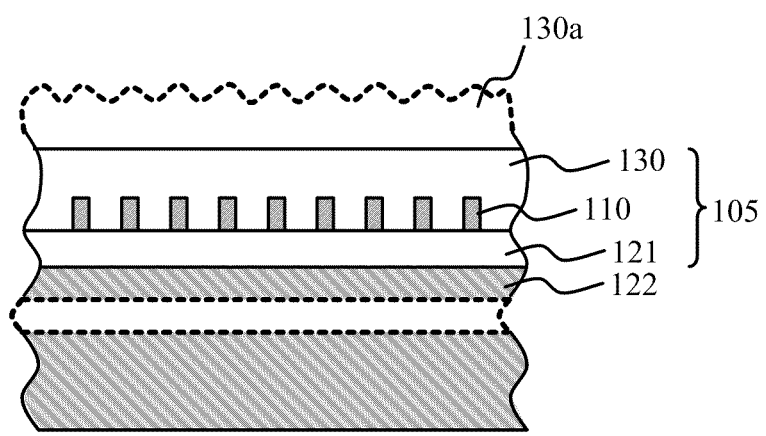
Figure 4C:
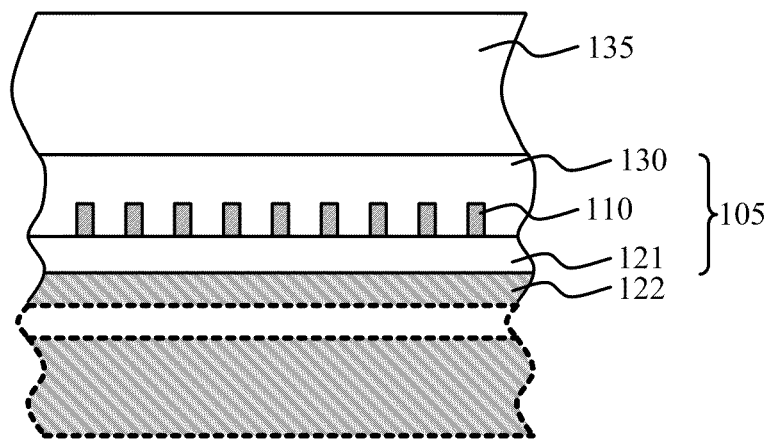
Figure 4D:
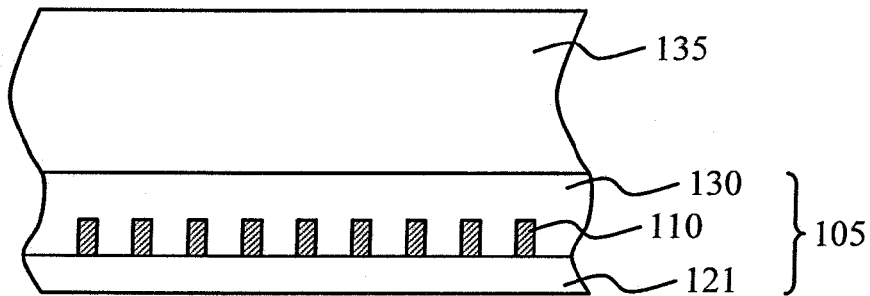
Figure 4E:
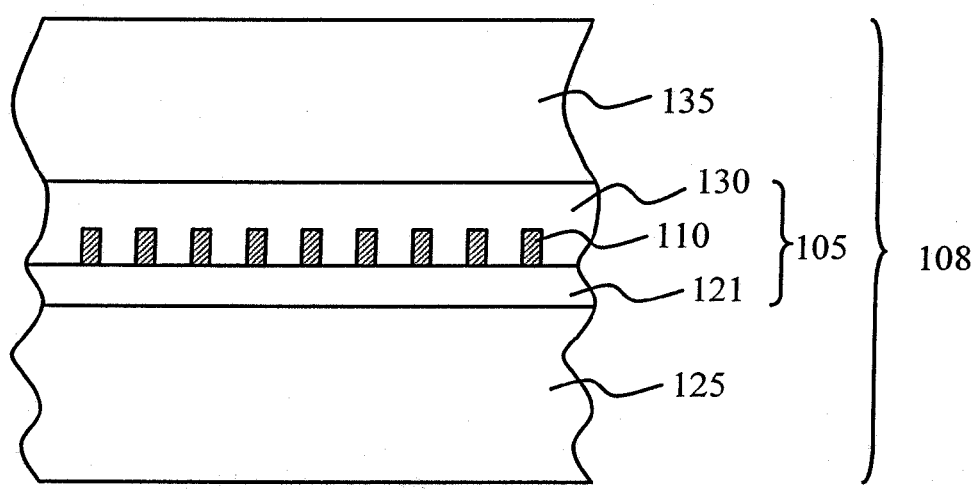

The overcoat film 130 made of the first transmissive material is then planarized and thinned to the first thickness above the straight wires 110, to form the thin composite plate 105 as shown in FIG. 4b. Then, bonding is applied to bond a first thick substrate 135 of a second thickness made of the second transmissive material to the planarized and thinned face of the overcoat film 130 as shown in FIG. 4c. The sacrificial substrate 122 is selectively removed from the first transmissive film 121 as shown in FIG. 4d, either by chemical mechanical polishing or selective wet etching or combination of both, to expose the opposite face of the first transmissive film 121 to the second thick substrate 125, leading to the identical configuration to the previous embodiment shown in FIG. 3. The same method of forming the thick composite plate 108 including the first thick substrate 135, the thin composite plate 105 and the second thick substrate 125 may be employed as stated above for this configuration, as shown in FIG. 4e and FIG. 3c.

Figure 5:
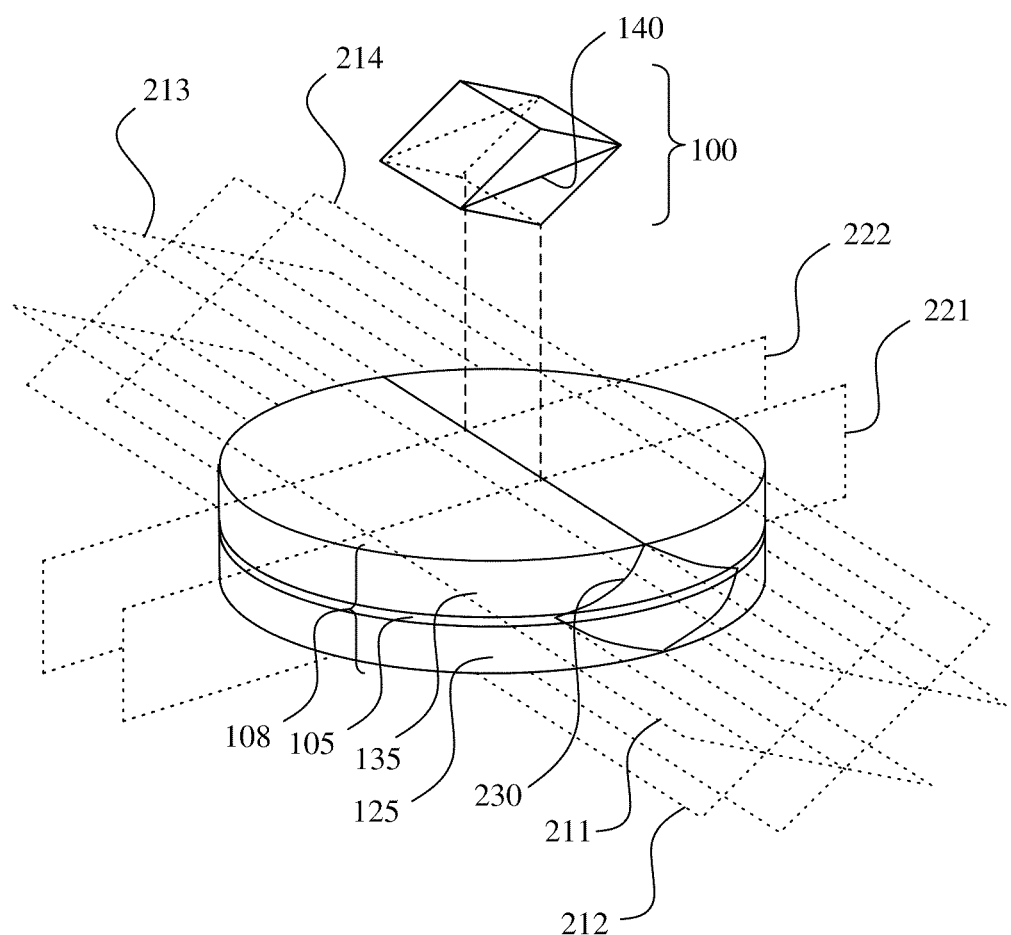
FIG. 5 is a schematic view of final machining of a polarizing cube 100 from a thick composite plate 108.

FIG. 5 is a schematic view of final machining of the polarizing cube 100 from a thick composite plate 108. After bonding, the thick composite plate 108 is first cut along four quadruplet orthogonal planes 211, 212, 213 and 214, perpendicular to each other but each being in 45 degree with the thin composite plate 105 being sandwiched between two thick substrates, i.e., the first thick substrate 135 and the second thick substrate 125 therein, to form a set of elongated cubic rods 230 with a first and second sets of opposite faces, each containing the thin composite plate 105 symmetric to the diagonal plane 140 of the elongated cubic rod 230.

Further cutting is applied though two cross sectioning planes 221 and 222 perpendicular to the first and second set of opposite faces of each elongated cubic rod 230 and the thin composite plate 105 being contained, to produce a set of polarizing cubes 100. Surface conditioning such as optical polishing may be further applied to each of the four faces on such a polarizing cube 100.

The present invention can provide improved integration and robustness for projection display application. The cubic configuration of the disclosed polarizer can be readily produced through common means and sequences typically used in semiconductor wafer fabrication processes, including photolithographic patterning, gap dielectric filling and planarization, and wafer thinning, bonding and cutting among others It is to be understood that the depicted embodiments of this disclosed invention are illustrative only and that modifications thereof may suggest themselves to those skilled in the related art. In addition, while a primary benefit of the disclosed invention is to improve the integration and system robustness of a wire grid polarizer in the visible spectrum with reflective imagers for projection display, the invention may also be employed for other applications such as in polarization of other regions of the spectrum, such as the infrared. Accordingly, this invention is not to be deemed as limited to the embodiments being disclosed, but is to be confined only as defined by the appended claims herein.

What is claimed is:

1. A polarizing cube, comprising:
a thin composite plate comprising a planar array of straight wires and a first transmissive material, said straight wires made of a reflective material, spaced apart in parallel and surrounded by the first transmissive material; and
a first thick substrate and a second thick substrate, made from a second transmissive material and bonded, respectively, to opposite faces of, and sandwiching the thin composite plate;
a pair of symmetric triangular prisms, made from the second transmissive material and bonded, respectively, to opposite faces of, and sandwiching the combination of the first thick substrate, the thin composite plate and the second transmissive material so as to form the polarizing cube;
wherein the thin composite plate and the pair of symmetric triangular prisms are optically symmetric about a diagonal plane of the polarizing cube, and the diagonal plane extends through the thin composite plate; and the first transmissive material is the same as the second transmissive material, and the first transmissive material and the second transmissive material are optically transmissive material.

2. The polarizing cube according to claim 1, wherein the first transmissive material and the second transmissive material are both made from silicon dioxide.

3. The polarizing cube according to claim 1, wherein four faces of the polarizing cube each sharing one edge with the thin composite plate are coated with an antireflective coating respectively.

4. The polarizing cube according to claim 1, wherein two faces of the polarizing cube perpendicular to the thin composite plate are coated with a light absorbing material.

5. The polarizing cube according to claim 1, wherein any one of two faces of the polarizing cube perpendicular to the thin composite plate is provided with a photovoltaic pane.

6. The polarizing cube according to claim 1, wherein the straight wires are made of any one or any combination of reflective metals selected from the group consisting of silver, aluminum, titanium and gold.

7. A polarizing cube, comprising:
a thin composite plate comprising a planar array of straight wires and a first transmissive material, said straight wires made of a reflective material, spaced apart in parallel and surrounded by the first transmissive material; and
a pair of symmetric triangular prisms, made from a second transmissive material and bonded, respectively, to opposite faces of, and sandwiching the thin composite plate so as to form the polarizing cube;
wherein the thin composite plate and the pair of symmetric triangular prisms are optically symmetric about a diagonal plane of the polarizing cube, and the diagonal plane extends through the thin composite plate;
any one of two faces of the polarizing cube perpendicular to the thin composite plate is provided with a photovoltaic panel; and
the first transmissive material and the second transmissive material are optically transmissive material.

8. The polarizing cube according to claim 7, wherein the first transmissive material is silicon dioxide.

9. The polarizing cube according to claim 7, wherein the second transmissive material is silicon dioxide.

10. The polarizing cube according to claim 7, wherein the first transmissive material is the same as the second transmissive material.

11. The polarizing cube according to claim 10, wherein the first transmissive material and the second transmissive material are both made from silicon dioxide.

12. The polarizing cube according to claim 7, wherein four faces of the polarizing cube each sharing one edge with the thin composite plate are coated with an antireflective coating respectively.

13. The polarizing cube according to claim 7, wherein two faces of the polarizing cube perpendicular to the thin composite plate are coated with a light absorbing material.

14. The polarizing cube according to claim 7, wherein the straight wires are made of any one or any combination of reflective metals selected from the group consisting of silver, aluminum, titanium and gold.

* * * * *